Figure 1:
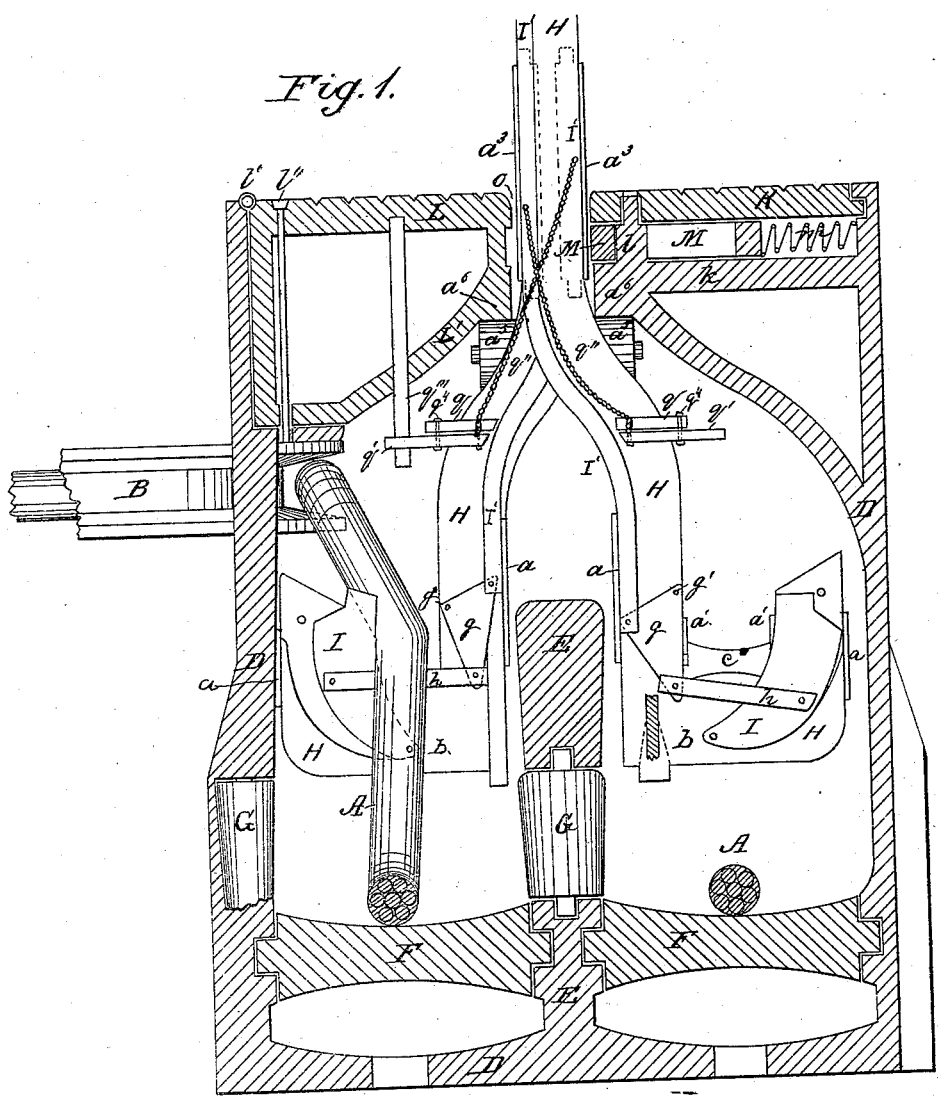

(No Model.)  
11 Sheets—Sheet 1.

F. DE VOOGHT
CABLE RAILROAD AND TRAMWAY.

No. 310,991. Patented Jan. 20, 1885.

WITNESSES:  
W. W. Hollingsworth  
W. X. Stevens

INVENTOR:  
F. de Vooght  
BY Munn & Co.  
ATTORNEYS.

(No Model.)  11 Sheets—Sheet 2.

F. DE VOOGHT
CABLE RAILROAD AND TRAMWAY.

No. 310,991.  Patented Jan. 20, 1885.

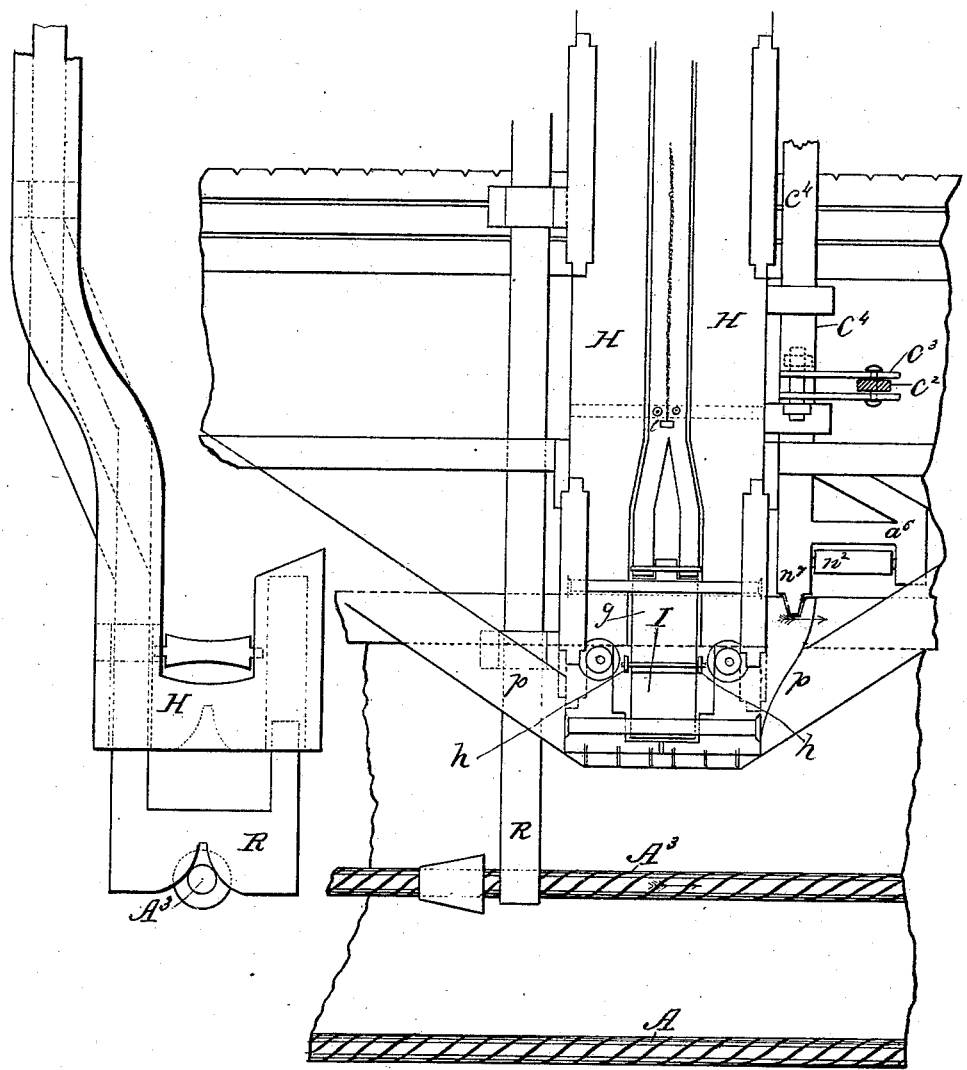

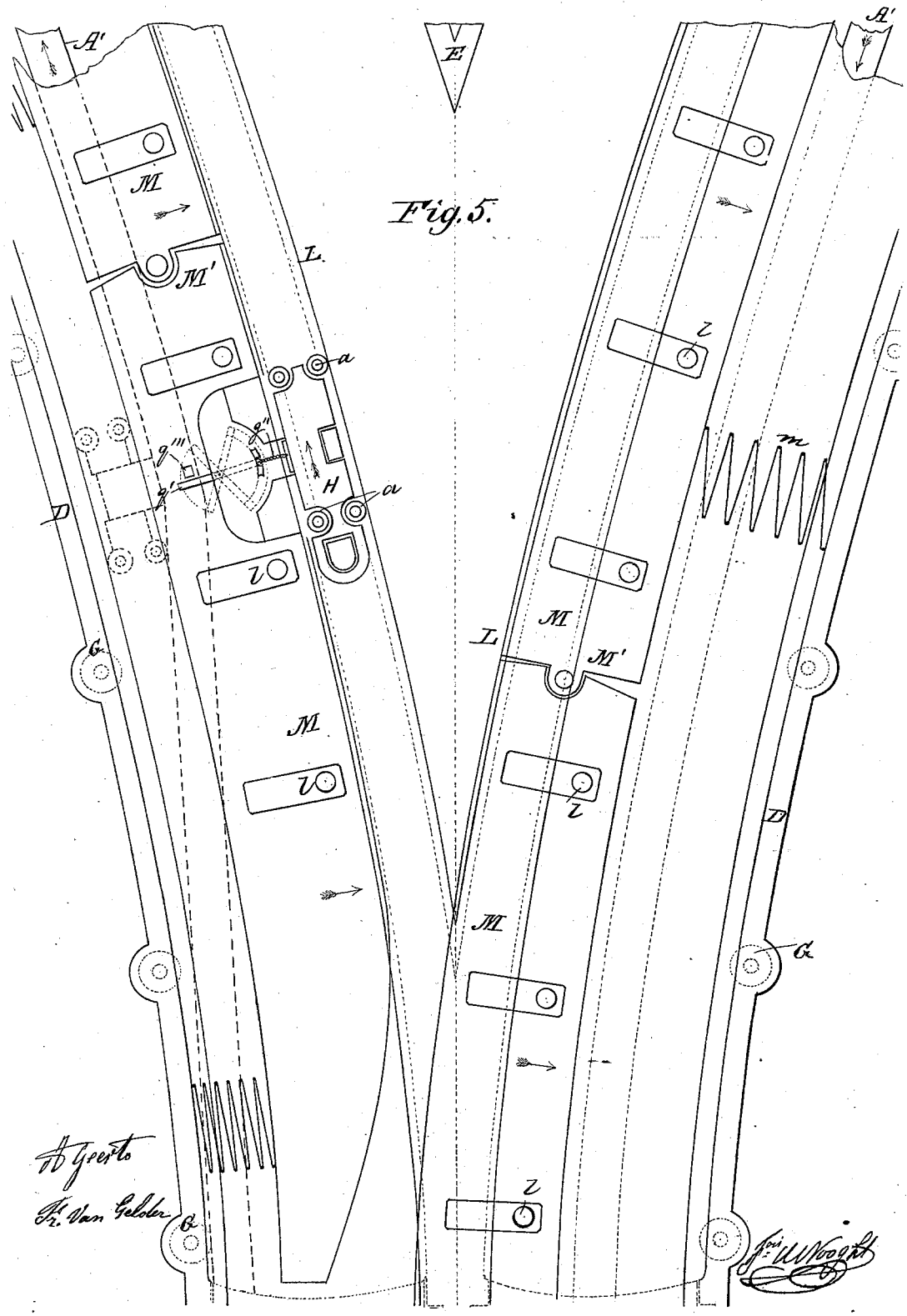

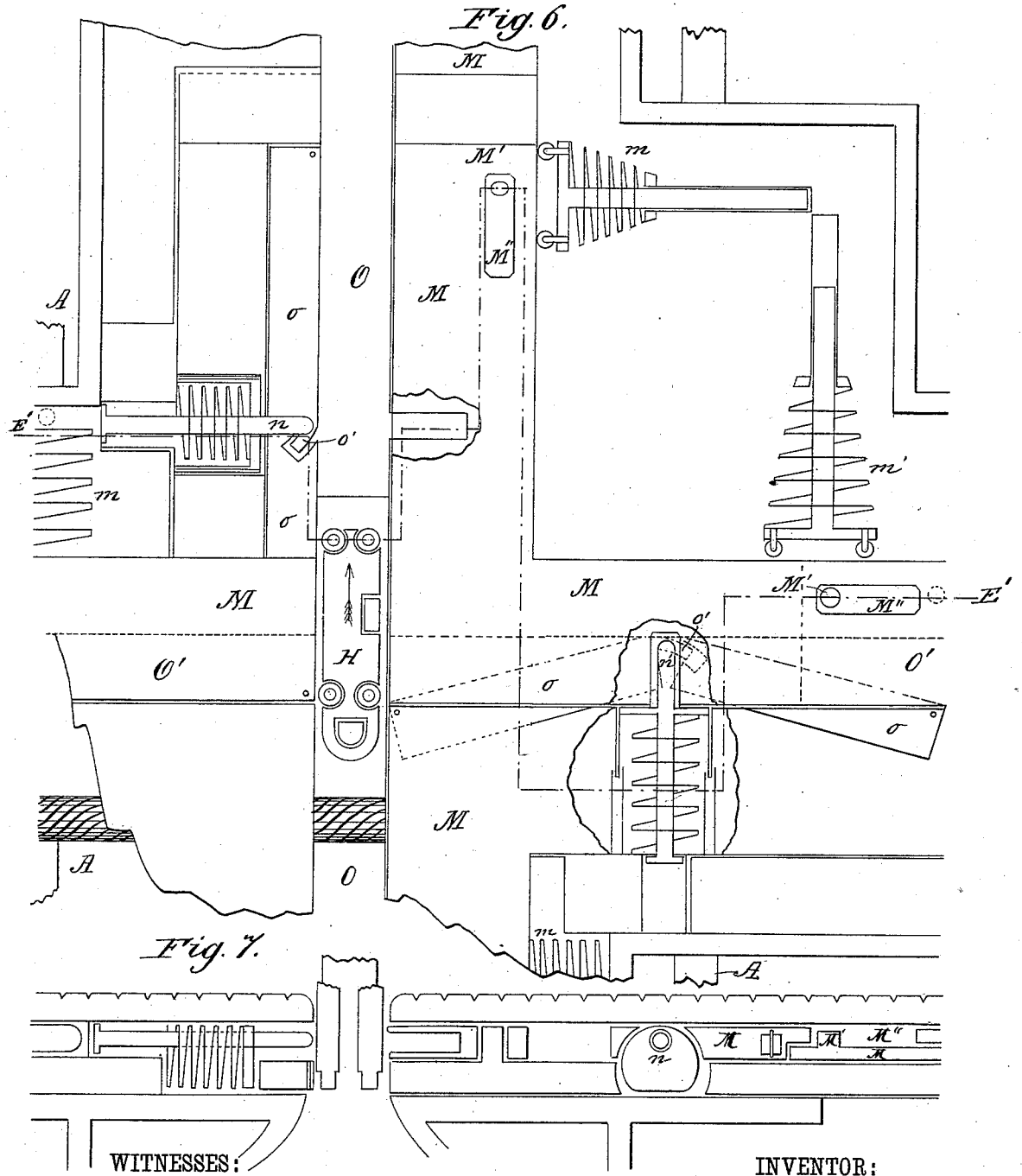

(No Model.) 11 Sheets—Sheet 6.
F. DE VOOGHT
CABLE RAILROAD AND TRAMWAY.
No. 310,991. Patented Jan. 20, 1885.
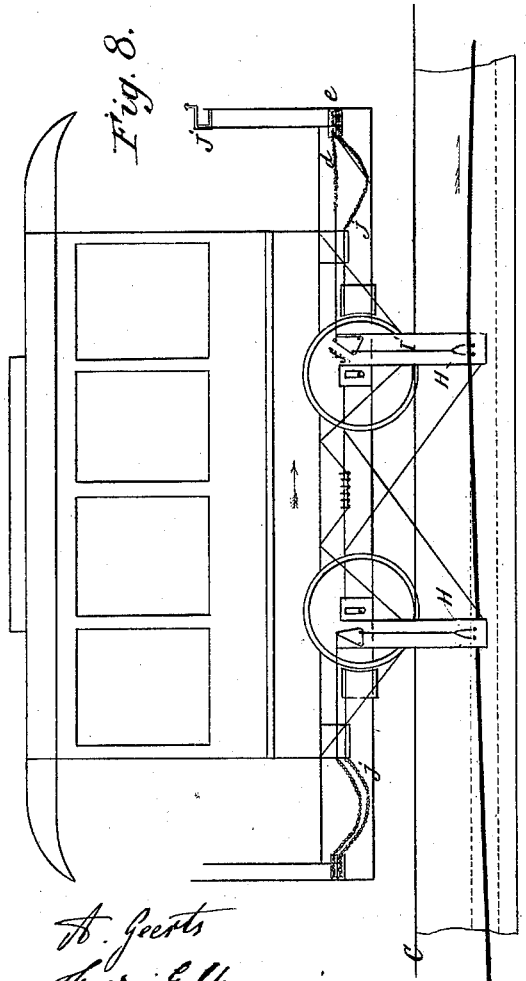
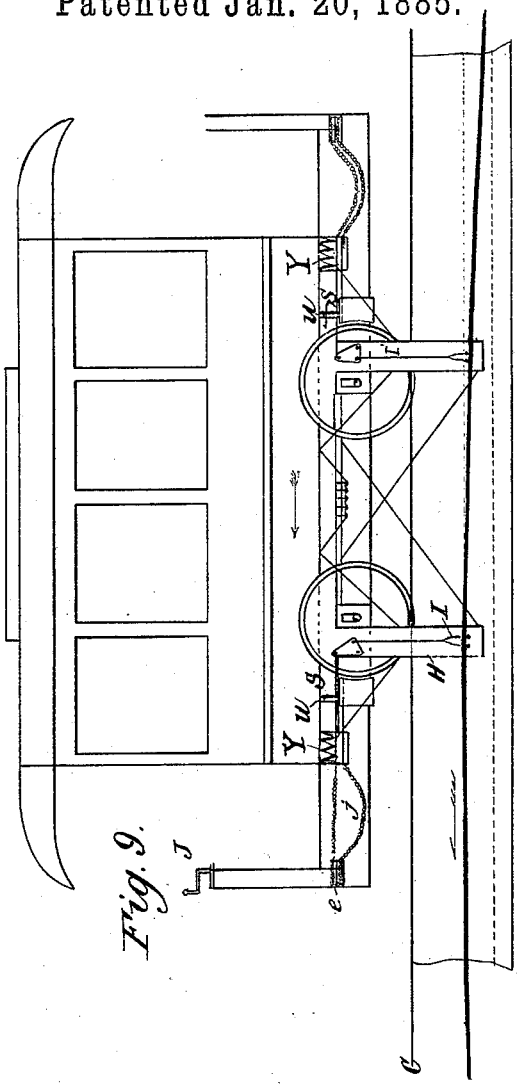

(No Model.) 11 Sheets—Sheet 7.
F. DE VOOGHT
CABLE RAILROAD AND TRAMWAY.
No. 310,991. Patented Jan. 20, 1885.

(No Model.)  
11 Sheets—Sheet 8.
F. DE VOOGHT
CABLE RAILROAD AND TRAMWAY.
No. 310,991. Patented Jan. 20, 1885.
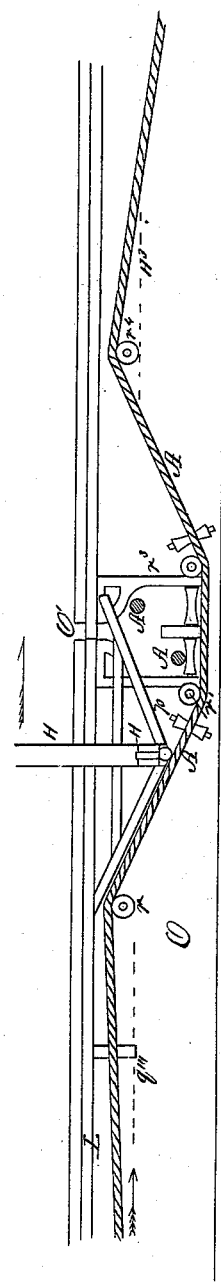
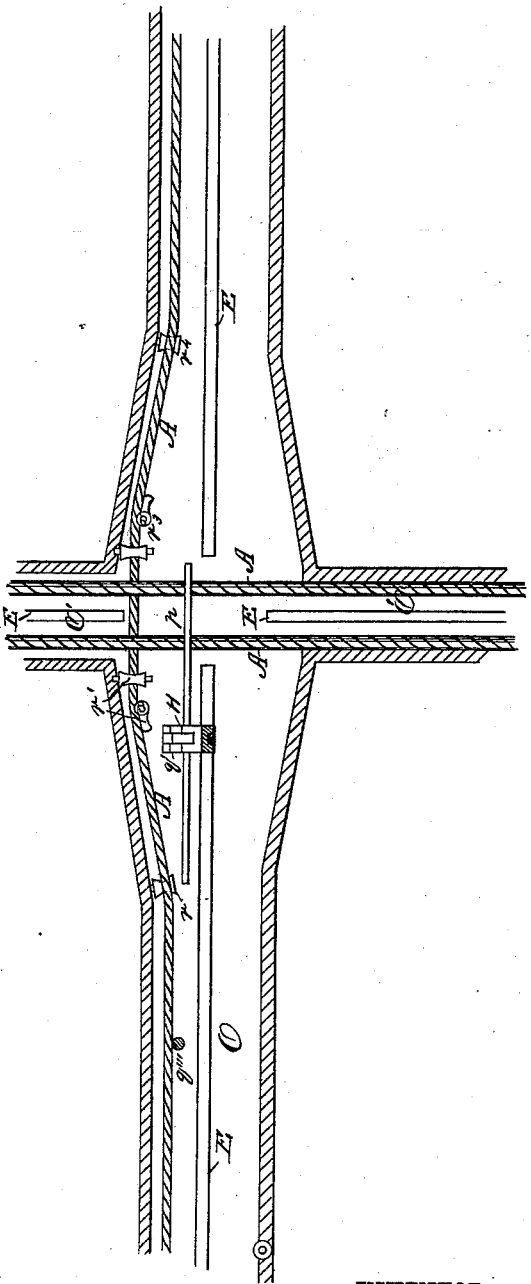
WITNESSES:  
W. W. Hollingsworth  
W. X. Stevens.
INVENTOR:  
F. de Vooght  
BY Munn & Co  
ATTORNEYS.

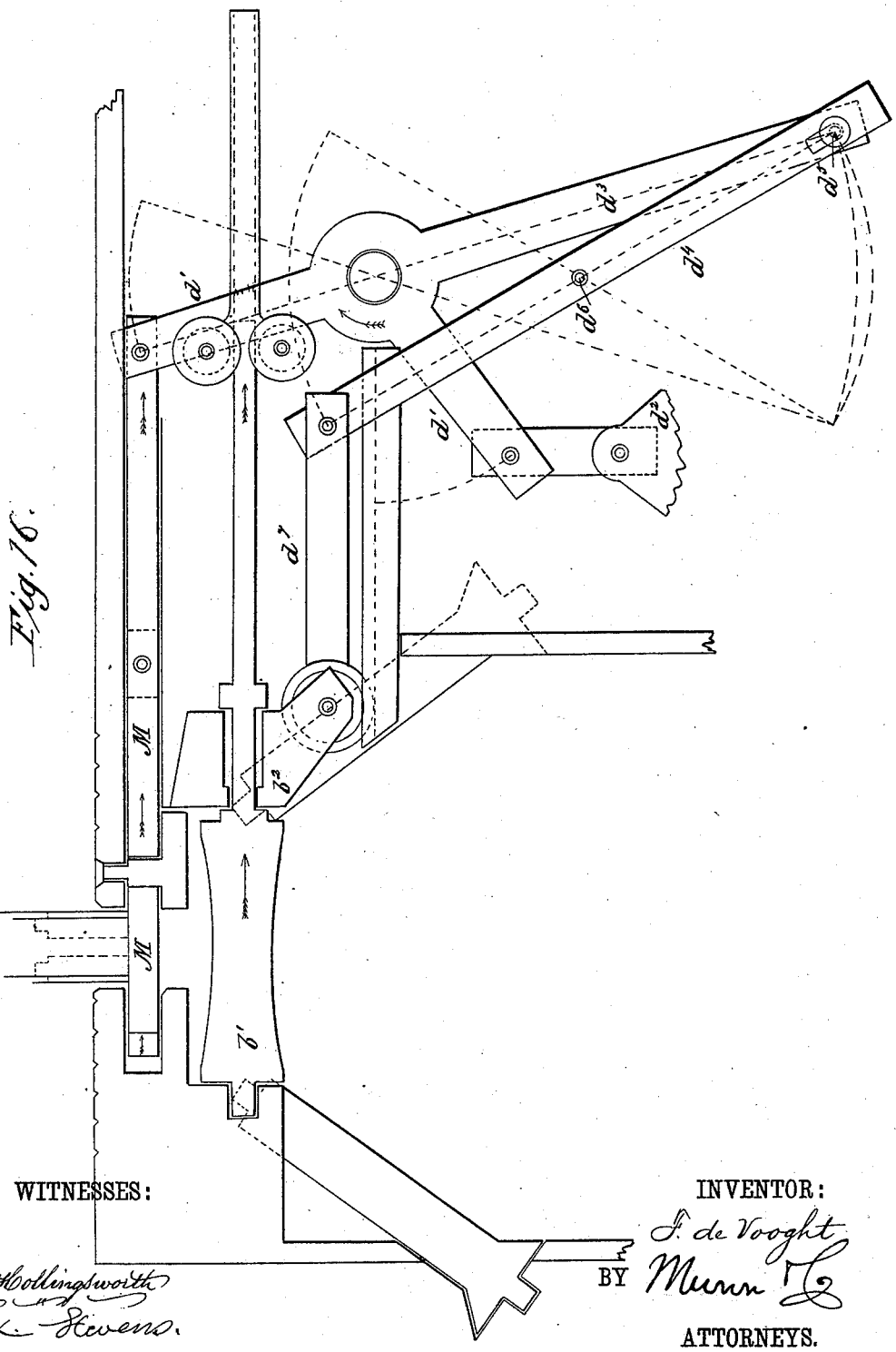

(No Model.)

11 Sheets—Sheet 10.

F. DE VOOGHT
CABLE RAILROAD AND TRAMWAY.

No. 310,991. Patented Jan. 20, 1885.

WITNESSES:
W. W. Hollingsworth
W. X. Stevens.

INVENTOR:
F. de Vooght
BY Munn & Co.
ATTORNEYS.

(No Model.)

11 Sheets—Sheet 11.

F. DE VOOGHT

CABLE RAILROAD AND TRAMWAY.

No. 310,991. Patented Jan. 20, 1885.

WITNESSES:

INVENTOR:
F. de Vooght
BY Munn
ATTORNEYS.

UNITED STATES PATENT OFFICE.

FRANCIS DE VOOGHT, OF ANTWERP, BELGIUM.

CABLE RAILROAD AND TRAMWAY.

SPECIFICATION forming part of Letters Patent No. 310,991, dated January 20, 1885.

Application filed September 17, 1881. (No model.)

*To all whom it may concern:*

Be it known that I, FRANCIS DE VOOGHT, a citizen of Belgium, and a subject of the King of the Belgians, residing at Antwerp, in the Province of Antwerp, have invented a new and useful Improvement in Cable-Railroads, of which the following is a specification.

My invention relates to railroads and tramways on which cars are propelled by endless ropes driven by stationary motors.

My invention consists, first, in means whereby the cars may be retained upon the rails on curves, or wherever side strains occur; second, in means whereby the cars are held down to prevent their tipping from the track on steep gradients; third, in means for conducting an endless cable to and from a given point within a shield or tube, to guard it from doing damage and from being damaged when conducted either above or below the surface of the ground; fourth, in means for avoiding friction of the cable on levels, on ascending and descending gradients and on curves; fifth, in hooks of peculiar form for attaching cars to and detaching them from the moving cable; sixth, in means for closing and unclosing the shield or tube to permit the car attachment to communicate with and be carried by the cable; seventh, in means for passing other similar cables at crossings; eighth, in means for closing and unclosing the tube to permit the hooks to pass crossings; ninth, in means for adapting the same car to run either way on the same track; tenth, in means for easing the shock of starting the car when suddenly attached to the cable; eleventh, in means for automatically disconnecting the hook from the cable and notifying the car-driver thereof at crossings; twelfth, in means for retaining the cable in its proper path where the tendency of the cables is to rise out; thirteenth, in means for retaining the cable in or removing from the drive-hooks on a rising road, as described and claimed, reference being had to the accompanying drawings, in which—

Figure 2:
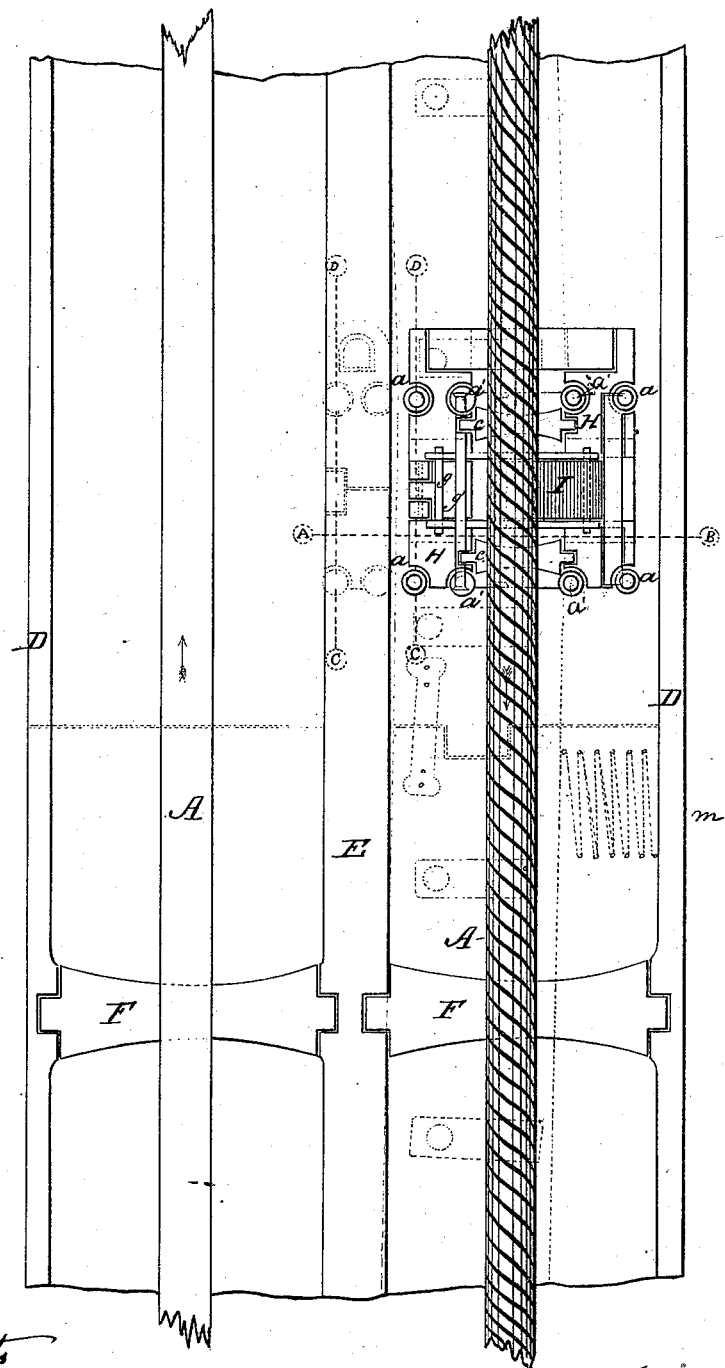
Figure 10:
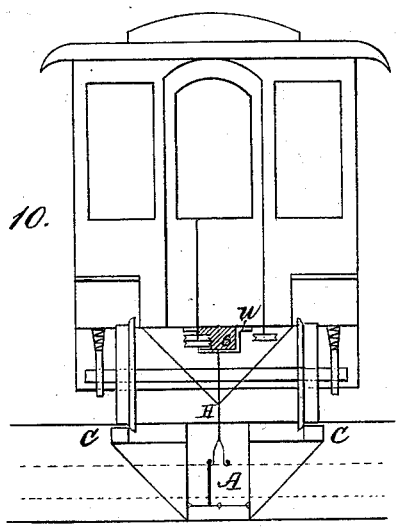
Figure 11:
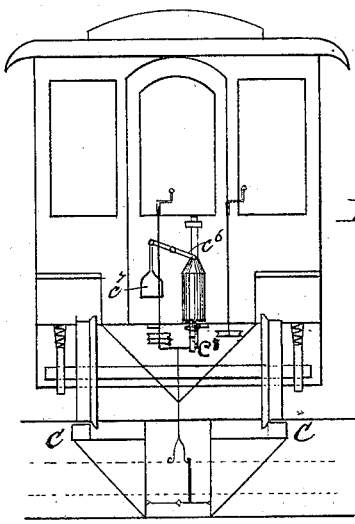
Figure 12:
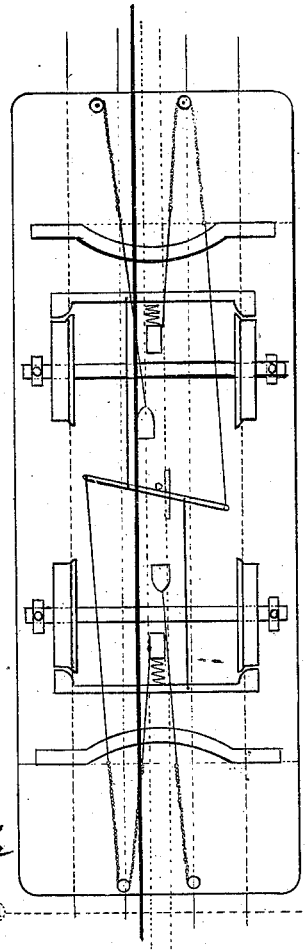
Figure 13:
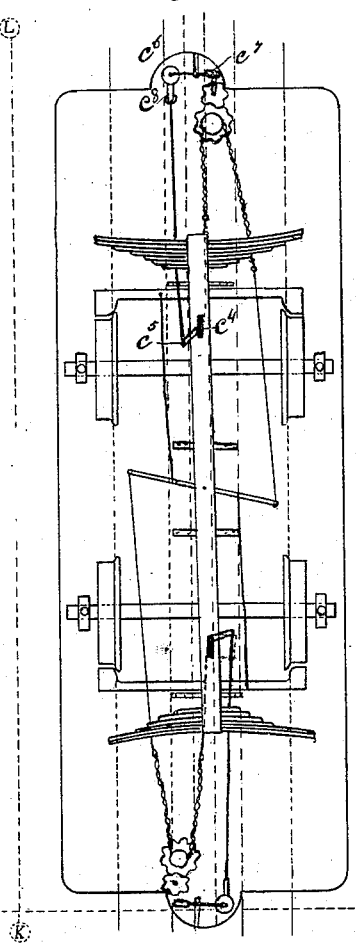
Figure 17:
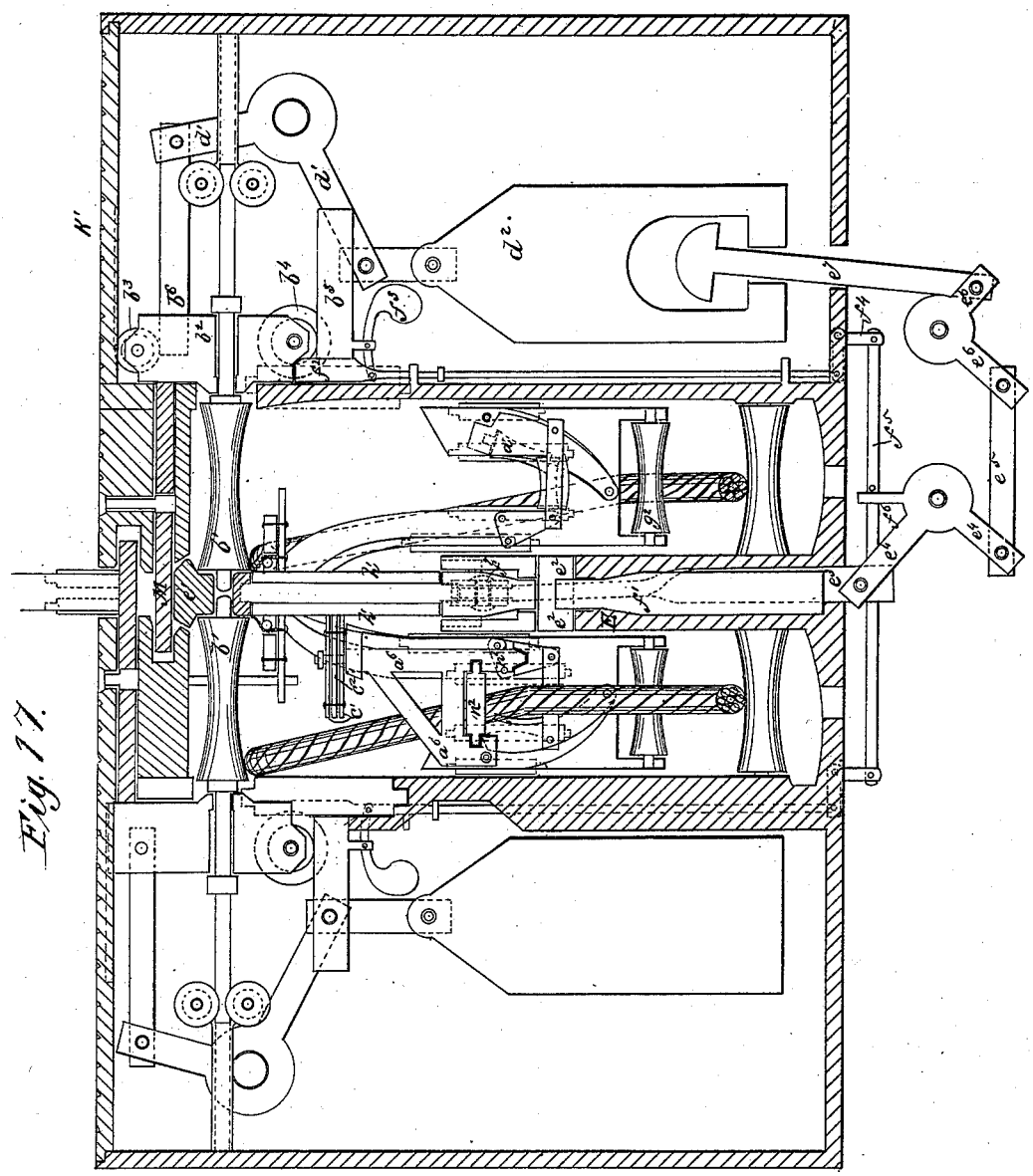
Figure 18:
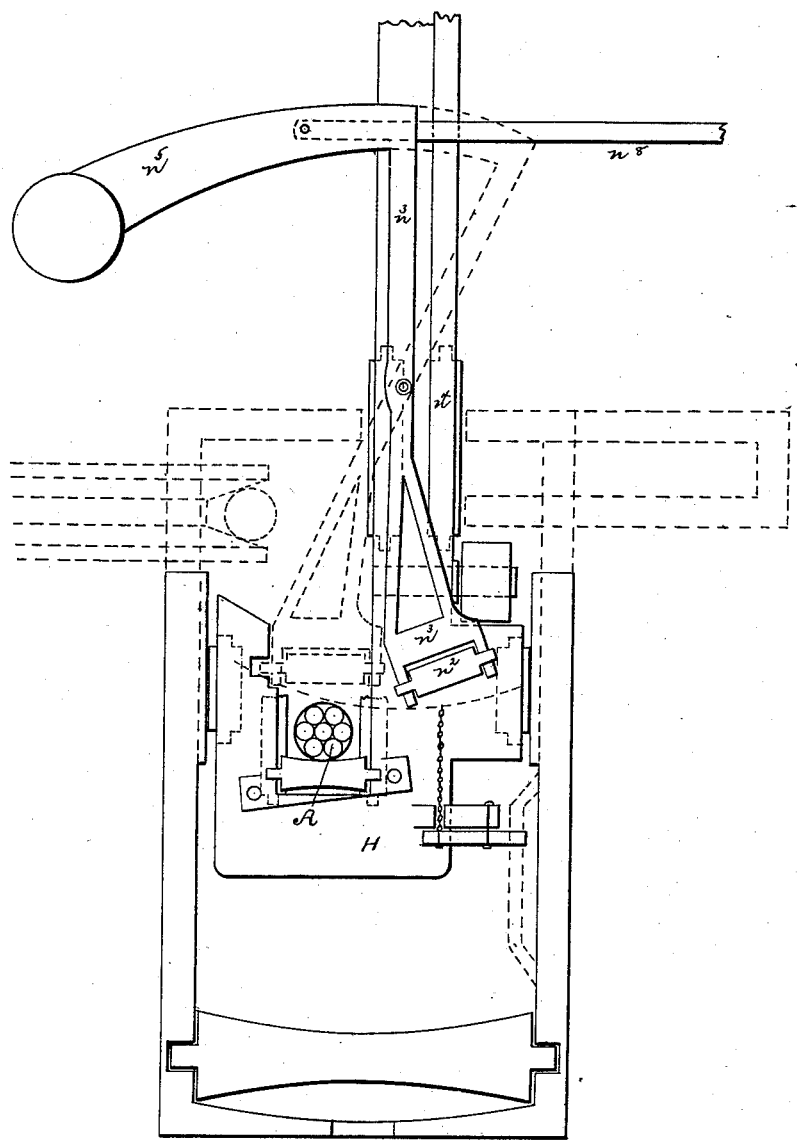

Figure 1 is a transverse vertical section of a double tube in which the cable and hooks travel, showing a portion of the hooks of a receding car. Fig. 2 is a horizontal section of a double tube, showing one hook part in plan. Fig. 3 is a longitudinal vertical section, part in elevation, of a portion of a tube, showing the back of the hook. Fig. 4 is a side elevation of a portion of a hook, and a forked foot for engaging balls on an auxiliary cable, showing these parts, as seen in viewing Fig. 3 from the right. Fig. 5 is a plan view of a tube bifurcated at a terminus. Fig. 6 is a plan view of a crossing of two tubes with the cover removed. Fig. 7 is a transverse vertical section on line E' E', Fig. 6, showing the cover. Fig. 8 is a side elevation of a car attached to a cable moving to the right. Fig. 9 is a side elevation of a car attached to a cable moving to the left. Figs. 10 and 11 are end elevations of a car on a track, showing means of connecting with the cable going either way. Figs. 12 and 13 are plan views showing the brake-operating devices. Fig. 14 is a side elevation, and Fig. 15 is a plan, showing the method of guiding the cable out of and into the hook at crossings, &c. Fig. 16 is a transverse vertical section of a portion of a single tube, showing a gradient roller and its operating mechanism in elevation. Fig. 17 is a similar view of a double tube and the devices required on a curve, and Fig. 18 is a transverse vertical section of a single tube, showing a removable cable-retaining device.

A represents an endless cable, which is caused to travel both ways continually along the road between the rails C by means of drive-wheels B, driven by any usual power—such as stationary engines.

To prevent wear and danger to passing objects, and to confine the cable to its proper path, I provide a continuous trough or tube, D, located centrally between the rails, and preferably, though not necessarily, buried level with the surface of the ground, within which tube both the approaching and receding portions of the cable travel. (See Fig. 2, in which the cable is approaching at the right and receding at the left.) To prevent these oppositely-running portions coming in contact with each other, I provide the tube D with a central partition, E, raised from the bottom to about one-half the interior height of the tube.

F represents rollers journaled in the tube, extending completely across the bottom of each half thereof, and serving as friction-rollers, upon which the cable travels.

G G (see Fig. 5) are rollers vertically journaled in the interior convex side of the tube at curves to keep the cable from rubbing the tube. To effect this, the rollers G must be near enough together so that tangent lines connecting their inner faces will not touch the wall of the tube, while the rollers project into the tube only so far as may be done without interfering with the duty of the tube. The partition E is similarly guarded by rollers G journaled therein. The car is connected with the cable by means of two hooks, H, secured to the car and depending therefrom within the tube D. (See Fig. 1.) The lower or hook end extends nearly across the interior of the tube from the partition to one side thereof, and is provided with rollers $a$, to run against said partition or side, as may be required, to prevent friction when the hook is carried along the tube. When it is desirable to have these rollers as large as possible, they may be mounted on the hook, one ahead of the other at the same end; or one roller at each end may be made large enough to project at both sides of the hook, and yet not so broad as the tube, thus serving to run against either the partition or the side of the tube, as required. The shanks of the hooks are provided with rollers $a^3$, to bear on the sides of the groove. The hooks, laterally rigidly fixed to the car and running in said groove, prevent the possibility of derailment of the car.

$a^6$ represents shelves on the tube-cover, whose under faces act as inverted rails beneath which rollers $a^5$ on the hooks run to hold the car upon or against the track where the grade of the road is very steep. Each hook is provided with two rollers, $c$, extending the whole breadth of the interior thereof, upon which the service-cable runs whenever the car is stopped. (See Fig. 2.) It is also provided with side rollers, $a'$, for the cable to run upon when the car stops on a curve. On starting the car that part of the cable running in the desired direction is taken into the hook, as shown at the left in Fig. 1, and the opposite part is left to run on rollers F, as seen at the right, beneath the oppositely-facing hook, which depends from the other end of the car. Each hook is laterally bifurcated, and a clamp, I, is journaled at $b$ between the two members thereof to clamp the cable by swinging upward and to the right, as shown at the left in Fig. 1. This clamp secures the car to the cable, causing the car to be drawn by the cable. The act of securing and releasing the clamp is performed by the car-brakeman as follows: By turning the handle J, Fig. 8, in one direction the chain $d$ is wound on the pulley $e$, and by means of the bell-crank $f$, and connections I', and bell-crank $g$, journaled in the hook at $g'$, and connections $h$, the clamp I is forced against the cable and the car is secured thereby. The act of turning handle J to clamp the cable loosens the car-wheel brakes by permitting the brake-chain $j$ to unwind from pulley $e$. The car continues clamped to the cable as long as the brakeman holds handle J the right way. The act of releasing the cable begins to tighten the car-brake chains, and by continuing the releasing motion of handle J the brake is applied to any degree required, even to the extent of quickly stopping the car. The top of the tube D is covered, excepting a central groove wide enough to receive the shanks of hooks H. The cap K, on one side of the groove, is provided with a tongue at its back edge, fitting a groove in the side wall of the tube, and rests near its front edge on studs $l$ of brackets $k$, which are a part of or secured to the tube-wall. The cap L, on the other side of the groove, is hinged, in sections of suitable length, to the tube-wall at $l'$, to be raised so that the interior of the tube may be reached for any purpose. This cap L has attached to it or as a part of it supporting braces or brackets L', resting on a ledge of the wall of the tube. Said cap is held down by a bolt, $l''$.

To cover the groove, I provide a series of plates, M, fitted to slide upon the brackets $k$ beneath cover K. Each plate is slotted to pass the studs $l$, and is pressed to slide across the groove by springs $m$. The adjacent plates are linked or hinged together at M', Fig. 5. A hook in entering the groove pushes back the first end of the first plate, and as it advances it pushes back the other end of the same plate, and with it the adjacent plate, as shown at the left, Fig. 5. The shanks of both hooks of a car travel in the same groove, holding the plates back until they both pass by, when the plates, pushed forward by springs $m$, close the groove behind the hooks. At the terminus of the road, where the cars enter their shed, the tube is dispensed with or spread at each side to form an open mouth to guide the hooks into the groove on starting; and the plate M is wedge-shaped at its first end to be crowded back from the groove by the entering hook. Where two roads cross each other the plates M cannot be permanently hinged together, for that would interrupt the crossing grooves. I therefore provide a self-adjusting removable connection, as shown in Fig. 6, whose action is as follows: Suppose the hook H to be receding along the groove O, crossing the covered groove O', the two plates M M to the right of groove O and beyond groove O' are secured together at their juncture to move as one plate, and each end thereof is loosely connected with its adjacent plate by means of slots M'' over the pins M', permitting either arm of the corner-plate M to slide longitudinally on said pins when the side of the opposite arm gives back from a passing hook. The corner-plate M is connected with the adjacent plate M, lying near the side of groove O', by means of a sliding spring-bolt, $n'$, which normally projects across groove O' from the nearest plate M, and is secured into a hole in the edge of the opposite plate M when that plate closes said groove O', as shown in Fig. 6. A hook, H, traveling in groove O in the direction of the arrow on the hook, first slides the nearest plate M relative to the spectator and relative to the hook H, traveling in the direction of the arrow away from the spectator to the right, and by means of bolt $n'$ also slides the corner-plates to the right against spring $m$, by which spring the plates are returned when the hook is passed. The plate M covering groove O' to the left of groove O is provided with a similar bolt, $n$, to engage and operate or to be operated by the opposite plate M by a hook passing in cross-groove O'. These bolts are removed from the grooves to permit a hook to pass, as follows: Two wedges, $o$, are hinged to swing in a rear attachment of plate M at each side and meet in front of a lower shoulder of bolt $n$, and have a curved dowel-connection, $o'$, with each other. These wedges $o$ $o$ stand inclined across the grooves O O', being pushed forward by the bolts $n$, as shown at the right in groove O', so that on the passage of a hook in either direction they are wedged back, carrying the bolt out of the path of the hook, as shown at the left in Fig. 7. The spring $m$ presses the corner-plates to cover the groove O, and the spring $m'$ presses said corner-plates to cover groove O'. In passing a crossing (see Figs. 14 and 15) a hook, H, attached to the upper cable need not be detached, the lower cable being guided down out of the path of the hook by the rollers $r'$ $r^3$; but when, as here shown, the hook belongs to that road whose cable is below the cable of the crossing road, the cable must be released from the hook just before arriving at the crossing, and the car allowed to pass the crossing by its momentum; then the hook is again clamped to the cable. To effect this release, the usual act of the brakeman for that purpose would do it; but I prefer to insure its being done by an automatic sentinel device, to wit: $q$ is a shelf fast upon the hook H. (See Fig. 1.) $q'$ is a lever journaled on a pin fixed in said shelf, and provided at one end with a cord or chain, $q''$, passing up through a hole in the shelf, and connecting it with the vertical operating-bar I' of clamp I. $q'''$ is a sentinel or stud, depending from the cover L, Fig. 14, at a little distance from the crossing, in the path of the outer arm of lever $q'$. When said lever strikes said stud, it draws upon chain $q''$, pulling down the operating-bar I', and, loosening the clamp I from the cable, which latter being thus released and being guided by an elevated roller, $r$, leaves the hook, then being guided to one side of the path of the hook and downward by rollers $r'$, it passes below the run-line of the crossing cables and hooks, and is returned to the path of its own hook by similar rollers, $r^3$ and $r^4$, and the hook, traveling at the height indicated by the dotted line $H^3$, again takes the cable thus laid into it. This is one characteristic of my invention. The cable is guided by means of pulleys into the path of the hook, where the hook may clamp it, and it is guided out of said path by similar rollers properly located wherever it is necessary that the cable should drop below the path of the hook, and I provide no other means of replacing the cable on the hook than guiding it to lie thereon. When signal-lever $q'$ strikes the sentinel-stud $q'''$ and pulls upon the clamp-operating bar, it pulls through the elbow-lever $f$ and chain $d$ upon the hand-lever J, Fig. 8, and notifies the brakeman of a crossing, and he may assist in freeing the cable, as before described. The hooks H are both firmly secured to a beam, S, fitted to slide about an inch endwise in yokes $u$, which are firmly secured to the under side of the car. At each end of beam S springs Y resist its endwise motion, for the purpose of lessening the shock on the machinery, of suddenly starting the car by means of the hook H and cable A. On very steep grades, where the tension of the cable is upward, so as to raise it out of the hook when loosened, I provide a roller, $n^2$, Fig. 18, journaled in an arm, $n^3$, which is pivoted to the shank of hook H at $n^4$, to swing over the path of the cable A, as shown in dotted lines. The arm $n^3$ is provided with a weighted lever, $n^5$, which balances roller $n^2$ to swing it out of the path of the cable. The lever $n^5$ is provided with connections $n^8$, an elbow-lever, and rod extending to the elbow-lever $c^8$, weighted lever $c^6$, and stirrup-lever $c^7$ at the driver's stand, whereby he may raise said lever and swing roller $n^2$ over the cable previous to releasing it when stopping on a steep grade, thereby retaining the cable between the clamping-jaws of the hook. When the tube and the slot in its top are not wide enough to permit the use of arm $n^3$ to carry roller $n^2$ to one side of the path of the cable, I provide a modification of said roller-frame, consisting of the frame $a^6$, Fig. 17, pivoted on a vertical post, $n^7$, to swing, like a gate, in the hook across over the path of the cable. The top of the post $n^7$, Fig. 17, is provided with a bifurcated arm, $c'$, connected by a rod, $c^2$, with another similar bifurcated arm, $c^3$, Fig. 3, on a vertical rod, $c^4$, which is provided with an arm, $c^5$, Fig. 13, connected with a weight and balance, $c^6$, by means of a bell-crank, $c^8$, Figs. 11 and 13, by which the gate $a^6$ is swung back and held out of the path of the rope, as in Fig. 3, unless the brakeman holds it turned across, as in Fig. 17. The lever of weight $c^6$ is provided with a stirrup, $c^7$, by which to hold the gate across the line. This device may be placed below the platform of the car, the stirrup being placed in position to be reached by the driver's foot.

I arrange the guiding-rollers of the cable in the tube and in the hooks so that the cable can never leave the hook when its tension would lift it out of the hook. When the path of the cable is upward and nearly coincides with the slot in the tube, so that said cable is liable to rise out of or to wear against the sides of said slot, I provide a roller, $b'$, journaled in a carriage, $b^2$, which is provided with rollers $b^3$ and $b^4$ to roll in grooves in the cap K', and a fixed bracket, $b^5$, respectively.

$d'$ is a bell-crank lever, connected at one end with the carriage $b^2$ by a rod, $b^6$, and at the other end with a weight, $d^2$, whose action is to press the carriage $b^2$ forward, holding the roller $b'$ across the path of the cable and of the hooks H. To remove this roller, to let the car pass, I attach the sliding plate M to the carriage $b^2$. Thus the usual action of said plate in being pressed back by the passing hooks carries the roller $b'$ also back out of the path of the hook. In this case I dispense with the returning-springs $m$, as the weight $d^2$ now serves to return both the roller $b^2$ and the plate M.

Fig. 16 shows another adaptation of this device, in which the plate M and the bell-crank $d'$ are not directly connected with the carriage $b^2$; but the said bell-crank is provided with a third arm, $d^3$, which is connected with another arm, $d^4$, by means of a pin and slot, $d^5$. Said arm $d^4$ is pivoted at $d^6$, and is connected by a rod, $d^7$, with the carriage $b^2$. By this means the short movement of the plate M in receding from the hook moves the roller $b$ a much longer distance, as shown by the angles in dotted lines. This proportion of movement is made necessary where the tube is made single and the space in top of the tube guarded by roller $b'$ is proportionately wide. The strain against roller $b'$ being very great at its end when the tension of the cable is toward the partition E, an end bearing, $e'$, Fig. 17, is provided therefor. This bearing, being directly in the path of the hook, must necessarily be removed for the hook to pass, which is done as follows: The bearing $e'$ is journaled to partition E at $e^2$, to swing out of line of the hook in the direction of its advance, actuated by a rod, $e^3$. This rod connects with bearing $e'$ by a longitudinally-projecting arm shown in dotted lines $f^7$, and receives its motion through bell-crank lever $e^4$, connecting-rod $e^5$, bell-crank $e^6$, and a button-headed rod, $e^7$. This rod $e^7$ fits loosely into a hole in weight $d^2$. When said weight is raised by the receding of plate M before a hook, it soon engages the head of rod $e^2$, and, through its connections, swings the bearing $e$ out of the path of the hook. The parts are all returned by the reverse movement caused by the descent of weight $d^2$, when released by the passage of the hooks from in front of plate M, and of the counterpoise $f'$, attached for that purpose to the frame of bearing $e'$; but in order that the bearing $e'$ may remain in place until the roller is withdrawn, and then be returned to place to receive the roller on its return, I fit the head of rod $e^7$ loosely into the weight $d^2$, and provide a latch, $f^2$, to intercept the return of carriage $b^2$ and roller $b'$. This latch is raised by a weighted lever, $f^3$, and is connected with the bearing $e'$ by means of the bell-crank $e^4$, which has an arm, $f^6$. When the weight $f$ returns bearings $e'$ to place, said arm $f^6$ engages a pin on rod $f^5$, actuating bell-crank lever $f^4$ to draw latch $f^2$ down, thus permitting the carriage $b^2$ to return roller $b'$ into the bearing $e'$. The sliding rollers $b'$ are relieved from the pressure of the cable on the arrival of the car by means of the hook-rollers $n^2$ on the side in which the hook is in service, and $g^2$ on the idle side. The cable may, when so desired, be laid in both hooks, that part of the cable going one way in one hook, and that part going the other way in the other hook. By this means the car may at any point on the road be stopped and returned. The cable may be of any practicable length, and any number of engines may be located at suitable points along the line of road, as at crossings, hill-tops, &c.

Having thus fully described my invention, what I claim, and wish to secure by Letters Patent, is—

1. A railroad having a pair of rails, and a tube secured upon the road between and parallel to said rails, said tube being open or slotted through its upper side, in combination with a car having wheels to run upon said track, and two or more hooks or hangers secured to said car, having rollers to run against the inner sides of said tube, as shown and described.

2. A pair of rails secured upon a road, a tube secured between the rails, parallel therewith, said tube being open or slotted through its upper side, and shelves therein serving as downwardly-facing rails, in combination with a car and wheels thereon to run upon said track, hooks depending from said car to enter said tube, and wheels or rollers journaled in said hooks to roll against the aforesaid downwardly-facing rails, as shown and described.

3. The combination, with a railroad and a car adapted to run thereon, of a tube secured between and parallel to the rails thereof, a slot in the center of the top of said tube, a partition rising from the bottom part way up the height of the tube, rollers journaled at one end in the side of the tube and at the other end in the partition, and an endless cable or rope in said tube, substantially as described.

4. A railroad, a car adapted to run thereon, an open-topped tube secured parallel with the rails thereof, and a cable in said tube, in combination with one or more hooks depending from the said car into the tube, rollers journaled in the tube to guide the cable free therefrom, and to guide the cable to lie into the said hook at all points of the line of the road, and means for securing the hooks to said cable or releasing them therefrom, as described.

5. A railroad, a car, and an endless traveling cable, and one or more hooks, H, secured to the car, adapted to receive the cable A, in combination with a clamping-jaw, I, hinged to said hook, an operating-handle, J, and means connecting it with said clamping-jaw, substantially as specified, whereby the clamp may be forced to engage the cable or to release it, as specified.

6. The hook H, the jaw I, hinged thereon, the bell-crank lever $g$, and connection $h$, in combination with the crank J, elbow-lever $f$, and connections, as shown and described.

7. The combination, with the tube D, of the half-cover L, provided with the bracket portion L', hinged to the tube at l', and the fastening-bolt l'', as shown and described.

8. The tube D, provided with the fixed brackets $k$ and the studs $l$ thereon, in combination with the removable half-cover K, tongued and grooved to the tube at one edge, and supported at the other edge on said studs $l$, as shown and described.

9. The tube D, having the central opening, O, between its covers, in combination with the sliding plates M, slotted to receive studs $l$, hinged together at M', and means for pressing them to slide across said opening, as described.

10. The combination, with two plates, M, attached together, forming an angle at a crossing, and having pin-holes in their edges, of two opposite plates M, spring-pins $n$ therein, adapted to engage said pin-holes, and the pin-removers, as shown and described.

11. The combination, with the tube D and the sliding plate M, of the bell-crank lever $d'$ and the weight $d^2$, as shown and described.

12. The combination, with the tube D and the sliding plate M, of the carriage $b^2$, having rollers $b^3$ and $b^4$, and the bracket $b^5$, secured to said tube, and grooves in said bracket and in the top of the tube to receive said rollers, as shown and described.

13. The tube D, having the grooved bracket $b^5$ and grooved top K', the carriage $b^2$, having rollers $b^3$ and $b^4$, the plate M, attached thereto, and means for operating the same, substantially as specified, in combination with the roller $b'$, journaled at one end in said carriage $b^2$ to slide therewith, as described.

14. The combination, with the roller $b'$, the carriage $b^2$, plate M and means for operating the same, and the tube D, containing them, of the bearing $e'$, pivoted to the partition E, and means for swinging the same out of the path of the hook by the action of sliding plate M, substantially as described.

15. The roller $b'$, the carriage $b^2$, the sliding plate M, the bell-crank lever $d'$, the hollow weight $d^2$, and the connecting-rods, in combination with the bearing $e'$, pivoted at $e^2$, the bell-crank levers $e^4$ and $e^5$, the weight $f'$ and connections, and the button-headed rod $e^7$, engaging the weight $d^2$, as shown and described.

16. The combination, with the tube D, provided with the sliding gradient rollers $b'$, of the hook H and the roller $g^2$, journaled therein, as shown and described.

17. The combination, with the hook H, of a roller, $n^2$, an arm, $n^3$, carrying the same, pivoted to the hook at $n^4$, to swing said roller across the hook, means for swinging the same, and the weighted arm $n^5$, attached thereto, as shown and described.

18. The combination, with the hook H, of the holding-down device consisting of the frame $a^6$, pivoted thereto by means of the vertical post $n^7$, the arms $c'$ on said post, the post $c^4$, pivoted to said hook, passing up in front thereof to the car, the arms $c^3$ on post $c^4$, the connecting-rod $c^2$, and means for turning post $c^4$, substantially as specified.

19. The combination, with the hook H and the holding-down device described, of the arm $c^5$ on post $c^4$, the weighted lever $c^6$, and the connections and the stirrup $c^7$, as shown and described.

20. The combination, with the hook H, of the shares $p$, secured thereon, as shown and described.

21. The combination, with a tube having the central slot, O, and the central partial partition, E, of the hook H, bent in its shank to travel in said slot, and at the same time, to avoid said partition, said hook being pointed upward and extending its hooking portion nearly across the space between the wall and partition of said tube, as and for the purpose specified.

22. A railway, a slotted partially-partitioned tube thereon, a cable traveling in said tube in opposite directions on opposite sides of said partition, a car upon said railway, and two hooks on the car entering said slotted tube and extending partially across the two channels thereof, each hook facing to the wall of the tubes, as described.

23. The combination, with the two hooks, H, and the beam S, carrying them, of the sliding ways $u$, securing said beam to a car, and the spring-buffers Y at the ends of said beam S, as shown and described.

24. The combination, with the hook H and its clamping-jaw I, of the lever $q'$, pivoted to the hook, means for connecting it with said jaw, and the sentinel-stud $q'''$, located in the path of said lever, as described.

25. A railway, a car thereon, a traveling traction-cable, a clamping device upon the car, and means, substantially as described, for securing it to the cable by turning the brake-lever in one direction and releasing it by turning said lever in the other direction, in combination with a car-brake and means connecting it with said lever, whereby the turning of the lever in one direction will first release the clamp from the cable and then apply the brake, and turning said lever in the other direction will first release the brake and then clamp the cable, as described.

Antwerp, August 19, 1881.

FRS. DE VOOGHT.

Witnesses:
C. LEYDEN,
A. GEERTS.